(12) United States Patent
Mobley et al.

(10) Patent No.: US 6,924,441 B1
(45) Date of Patent: Aug. 2, 2005

(54) LOAD CELL APPARATUS

(75) Inventors: Donald L. Mobley, Batesville, IN (US); Steve A. Dixon, Cincinnati, OH (US); Randall K. Hopkins, Mendon, MA (US)

(73) Assignee: Hill-Rom Services, Inc., Wilmington, DE (US)

(*) Notice: Subject to any disclaimer, the term of this patent is extended or adjusted under 35 U.S.C. 154(b) by 540 days.

(21) Appl. No.: 09/669,707

(22) Filed: Sep. 26, 2000

Related U.S. Application Data (60) Provisional application No. 60/156,581, filed on Sep. 29, 1999.

(51) Int. Cl.[7] .......................... G01G 3/13; G01G 19/52
(52) U.S. Cl. .................. 177/144; 177/229; 177/DIG. 9
(58) Field of Search ................ 177/144, 211, 229, 177/DIG. 9

(56) References Cited

U.S. PATENT DOCUMENTS

| | | | |
|---|---|---|---|
| 2,990,899 A | 7/1961 | De Bella | 177/144 |
| 3,217,818 A | 11/1965 | Engelsher et al. | 177/144 |
| 3,338,323 A | 8/1967 | Swersey | 177/144 |
| 3,360,062 A | 12/1967 | Potter | 177/144 |
| 3,512,595 A | 5/1970 | Laimins | 177/187 |
| 3,656,478 A | 4/1972 | Swersey | 177/164 |
| 3,722,611 A | 3/1973 | Tirkkonen | 177/144 |
| 3,773,124 A | 11/1973 | Bullivant | 177/144 |
| 3,795,284 A | 3/1974 | Mracek et al. | 177/144 |
| 3,876,018 A | 4/1975 | Mracek et al. | 177/132 |
| 3,961,675 A | 6/1976 | Siegel | 177/126 |
| 3,998,790 A | 12/1976 | Brändström et al. | 260/570.7 |
| 4,006,789 A | 2/1977 | Stultz et al. | 177/126 |
| 4,015,677 A | 4/1977 | Silva et al. | 177/165 |
| 4,023,633 A | 5/1977 | Swersey et al. | 177/144 |
| 4,033,420 A | 7/1977 | De Masters | 177/126 |
| 4,215,754 A | 8/1980 | Hagedorn et al. | 177/137 |
| 4,281,730 A | 8/1981 | Swersey et al. | 177/144 |
| 4,363,368 A | 12/1982 | Paddon et al. | 177/144 |
| 4,411,327 A | 10/1983 | Lockery et al. | 177/211 |
| 4,438,823 A | 3/1984 | Hussels et al. | 177/210 EM |
| 4,483,404 A | 11/1984 | Weihs | 177/225 |
| 4,487,276 A | 12/1984 | Swersey et al. | 177/1 |
| 4,492,281 A | 1/1985 | Van Allen et al. | 177/213 |
| 4,539,560 A | 9/1985 | Fleck et al. | 177/144 |
| 4,550,793 A | 11/1985 | Giles | 177/145 |
| 4,551,882 A | 11/1985 | Swersey et al. | 16/226 |
| 4,601,356 A | 7/1986 | Muccillo, Jr. | 177/211 |
| 4,629,015 A | 12/1986 | Fried et al. | 177/25.19 |
| 4,751,754 A | 6/1988 | Bailey et al. | 5/68 |
| 4,793,428 A | 12/1988 | Swersey | 177/144 |

(Continued)

FOREIGN PATENT DOCUMENTS

EP 0 838 659 A2 4/1988

(Continued)

OTHER PUBLICATIONS

"Patient Bed Scales", Health Devices, Feb. 1984.

(Continued)

*Primary Examiner*—Randy W. Gibson
(74) *Attorney, Agent, or Firm*—Bose McKinney & Evans LLP (57) ABSTRACT

A patient support including a mattress, a load cell apparatus, and a frame having an intermediate frame and a weigh frame. The load cell apparatus is positioned relative to the intermediate frame and the weigh frame. The load cell apparatus includes a load cell, a mount, and a liner.

65 Claims, 10 Drawing Sheets

U.S. PATENT DOCUMENTS

| | | |
|---|---|---|
| 4,899,840 A | 2/1990 | Boubille .................... 177/139 |
| 4,926,951 A | 5/1990 | Carruth et al. ............. 177/144 |
| 4,934,468 A | 6/1990 | Koerber, Sr. et al. ....... 177/144 |
| 4,953,244 A | 9/1990 | Koerber, Sr. et al. ....... 177/144 |
| 4,961,470 A | 10/1990 | Koerber, Sr. ................ 177/144 |
| 4,974,692 A * | 12/1990 | Carruth et al. ............. 177/144 |
| 5,173,977 A | 12/1992 | Carruth et al. ............. 177/144 |
| 5,269,388 A | 12/1993 | Reichow et al. ........... 177/144 |
| 5,276,432 A | 1/1994 | Travis ........................ 177/144 |
| 5,393,935 A | 2/1995 | Hasty et al. ................. 177/45 |
| RE35,301 E | 7/1996 | Reichow .................... 177/136 |
| 5,600,104 A | 2/1997 | McCauley et al. .......... 177/136 |
| 5,672,849 A | 9/1997 | Foster et al. ............... 177/144 |
| 5,715,548 A | 2/1998 | Weismiller et al. ........... 5/624 |
| 5,747,745 A * | 5/1998 | Neuman ..................... 177/132 |
| 5,771,511 A | 6/1998 | Kummer et al. ............... 5/600 |
| 5,823,278 A * | 10/1998 | Geringer ..................... 177/144 |
| 5,859,390 A * | 1/1999 | Stafford et al. ............. 177/144 |
| 5,861,581 A | 1/1999 | Evans et al. ................ 177/136 |
| 5,906,016 A | 5/1999 | Ferrand et al. ............. 177/144 |
| 6,150,619 A | 11/2000 | Borngasser ................. 177/201 |
| 6,362,439 B1 * | 3/2002 | Reichow ..................... 177/144 |
| 6,680,443 B2 * | 1/2004 | Dixon ........................ 177/144 |

FOREIGN PATENT DOCUMENTS

| | | |
|---|---|---|
| EP | 0 322 994 | 5/1989 |
| EP | 0 744 598 A1 | 11/1996 |
| WO | WO 00/51541 | 9/2000 |

OTHER PUBLICATIONS

Hill-Rom, Inc., "A Hill-Rom Solution Totalcare Bed System", brochure, 1998.

Hill-Rom, Inc. "A Hill-Rom Solution Advance Series Be", brochure, 1996.

Hill-Rom, Inc., "A Hill-Rom Solution Century CC Bed", brochure, 1996.

Hill-Rom, Inc., "The Century CC Bed from Hill-Rom", brochure, 1992.

* cited by examiner

LOAD CELL APPARATUS

This application claims the benefit of U.S. Provisional Application No. 60/156,581, filed on Sep. 29, 1999, which is expressly incorporated herein by reference.

BACKGROUND AND SUMMARY OF THE INVENTION

The present invention relates to load cells and particularly to load cells that generate signals indicative of loads applied to the load cells. More particularly the present invention relates to load cell isolation in load cell systems.

It is well known to use load cells to sense loads. Conventional load cells typically include a block and one or more strain gages mounted to the block. Deflection of the block due to an applied load changes the shape of the strain gages resulting in a change in the resistance of the strain gages. Generally, a known input voltage is applied to the strain gages and an output signal from the strain gages varies as the resistance of the strain gages vary to provide a signal indicative of the load applied to the load cell. Load cells are sometimes used in hospital beds as part of a weigh system that senses, for example, the weight of a patient supported by the bed. It is desirable, of course, for weigh systems to provide accurate weight readings and therefore, it is desirable to minimize sources of error that may contribute to inaccurate output signals from the load cells.

According to an illustrated embodiment of the present invention, a load cell apparatus includes a cell block adapted to couple to a first structure, a mount adapted to couple to a second structure, and a stud extending from the cell block. The mount is made of a first material and is formed to include a bore. The load cell apparatus further includes a liner that is positioned to lie in the bore and that engages the stud. The liner is made of a second material that is more lubrous than the first material.

In one embodiment, the stud extending from the cell block includes a cylindrical portion and the liner is formed to include a cylindrical cavity that receives the cylindrical portion of the stud. In addition, the bore of the mount is generally square-shaped and the outer surface of the liner is square-shaped. In this embodiment, the liner press fits into the bore of the mount. The liner may include portions that protrude from the outer surface thereof to enhance the press fit of the liner in the bore of the mount.

In another embodiment, the stud extending from the cell block includes a cylindrical portion and the liner comprises a pad of material positioned to lie in the bore underneath the cylindrical portion of the stud. In yet another embodiment, the stud extending from the cell block includes a spherical portion and the liner comprises a pad of material positioned to lie in the bore underneath the spherical portion of the stud.

In a further embodiment, the stud extending from the cell block includes a cylindrical portion and the liner coats the stud. In this embodiment, the coated stud extends into the bore and engages the mount. In yet another embodiment, the stud extending from the cell block includes a spherical portion and the liner is formed as an O-ring coupled to the spherical portion.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

The present invention relates to a load cell apparatus and will be described herein as used in a weigh system of a hospital bed. However, the load cell apparatus of the present invention is not limited to use in a hospital bed and those skilled in the art will appreciate that the present invention may be used in a wide variety of applications where loads are sensed.

Figure 1:
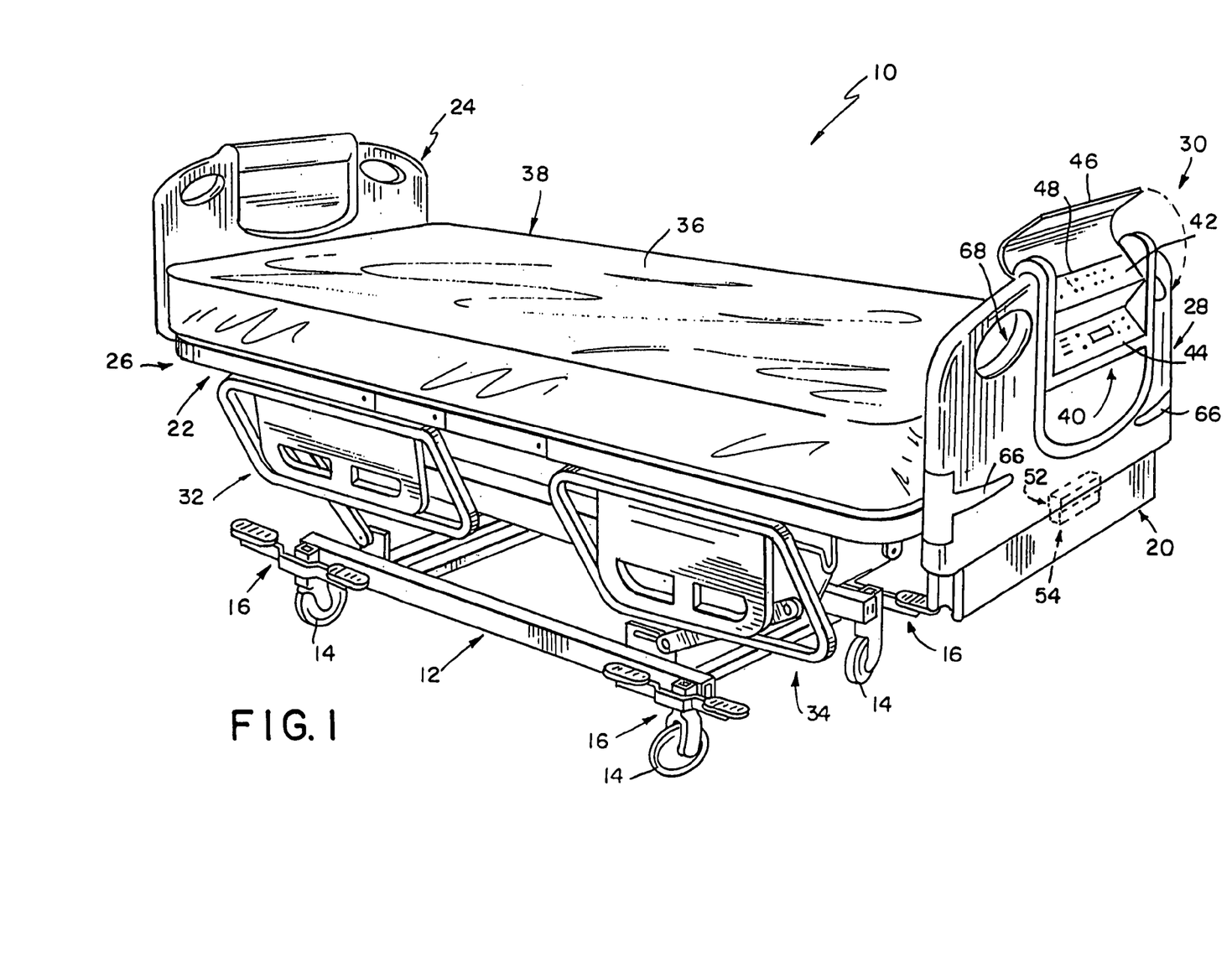
FIG. 1 is a perspective view of a hospital bed having a weigh system including load cell apparatus constructed in accordance with the present invention.
Figure 2:
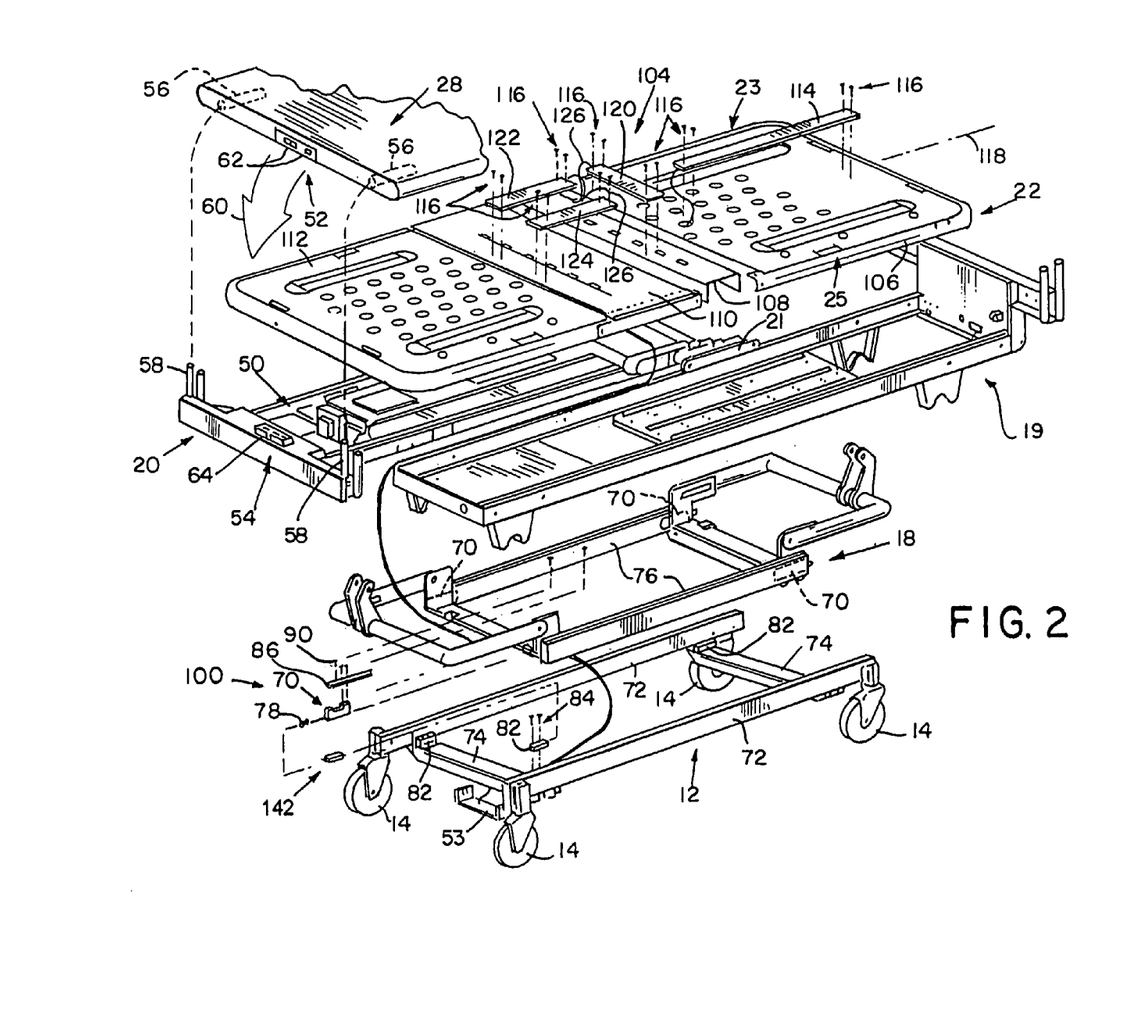
FIG. 2 is an exploded perspective view of portions of the hospital bed of FIG. 1 showing a base frame with casters mounted thereto, a weigh frame above the base frame, an intermediate frame above the weigh frame, a retracting frame above the intermediate frame, and an articulating deck above the retracting frame.

A hospital bed 10 includes a base frame 12 to which a plurality of casters 14 are coupled as shown in FIG. 1. Illustrative bed 10 also includes brake/steer control pedals 16 coupled to base frame 12 adjacent respective casters 14. As best shown in FIG. 2, bed 10 includes a weigh frame 18 coupled to base frame 12, an intermediate frame 19 coupled to the weigh frame 18, a retracting frame 20 coupled to the intermediate frame 19, and an articulating deck 22 coupled to the intermediate frame 19 and to the retracting frame 20. Deck 22 includes a head section 106, a seat section 108, a thigh section 110, and a foot section 112. Brackets 21 on opposite sides of frame 20 are configured to be coupled between the head section 106 and the thigh section 110 of deck 22 with suitable fasteners (not shown).

Bed 10 includes a headboard 24 mounted adjacent a head end 26 of bed 10 and a footboard 28 mounted to the frame adjacent a foot end 30 of bed 10 as shown in FIG. 1. Bed 10 further includes a pair of head end siderails 32 and a pair of foot end siderails 34 mounted to the articulating deck 22 on opposite sides of bed 10. Side rails 32, 34 are movable from a lowered position shown in FIG. 1 to an elevated position (not shown) located above a top surface 36 of a mattress 38 that is supported by deck 22.

Controls for controlling various functions of bed 10 are included in siderails 32 and in footboard 28. Illustrative controls 40 are located on a top inclined panel 42 and bottom inclined panel 44 on the footboard 28. A cover 46 is pivotably coupled to the footboard 28 for movement between a raised position, shown in FIG. 1, exposing panel 42 and a lowered position (not shown) concealing panel 42. Footboard 28 also includes side bumpers 66 and hand grip apertures 68.

Controls 40 on footboard 28 are electrically coupled to a controller 50 shown in FIG. 2. Controller 50 and other bed electronics are illustratively mounted on frame 20. Signals from controls 40 route to controller 50 through a connector 52 that is coupled to footboard 28 and also route through a connector 54 that is coupled to frame 20. Connector 52 disconnects from connector 54 when the footboard 28 is removed from frame 20 as shown in FIG. 2. Footboard 28 is formed to include apertures 56 that slide over posts 58 on frame 20 during installation of footboard 28 on frame 20 in the direction of arrow 60 in FIG. 2.

Additional details of bed 10 are disclosed in U.S. patent application Ser. No. 09/264,174 entitled PATIENT POSITION DETECTION APPARATUS FOR A BED and in U.S. patent application Ser. No. 09/263,039 entitled CASTER AND BRAKING SYSTEM, each of which are assigned to the assignee of the present invention and each of which are hereby incorporated by reference herein. As mentioned above, the details of bed 10 are given only to provide a description of one type of application in which the load cell apparatus of the present invention may be used and such details are not intended to limit the scope of the invention in any manner.

Controls 40 on lower panel 44 include controls for operating a weigh system of bed 10. The weigh system includes load cell apparatus 100 in accordance with the present invention. The weigh system also includes patient-position sensors 114, 120, 122, 124 coupled to deck 22 by suitable fasteners 116 as shown in FIG. 2. Further details of sensors 114, 120, 122, 124 are provided in U.S. patent application Ser. No. 09/264,174.

Weigh frame 18 and the portions of bed 10 thereabove are supported relative to base frame 12 by the load cell apparatus 100. Base frame 12 includes side frame members 72 and transverse frame members 74 extending between side frame members 72 as shown, for example, in FIG. 3. Weigh frame 18 includes a pair of hollow side frame members 76 and a pair of transverse frame members 77 extending between side frame members 76.

The description below of a single load cell apparatus 100 is descriptive of all of them unless specifically noted otherwise. Load cell apparatus 100 includes a load member, load beam, or cell block (hereinafter "cell block 70") that is mounted at one of the four corners of the weigh frame 18. Strain gages (not shown) are included in each load cell apparatus 100 and are coupled to each respective cell block 70. The strain gages operate in a conventional manner to provide an indication of the load supported by the load cell apparatus 100. That is, a known input voltage is applied to input leads (not shown) coupled to the strain gages and, as cell blocks 70 deflect due to the application of a load, the resistance of the strain gages changes resulting in a change in an output signal generated on output leads (not shown) coupled to the strain gages. In the illustrative embodiment, the input and output leads are bundled together in a cable 102 that is routed between load cell apparatus 100 and conventional signal conditioning circuitry (not shown).

Figure 3:
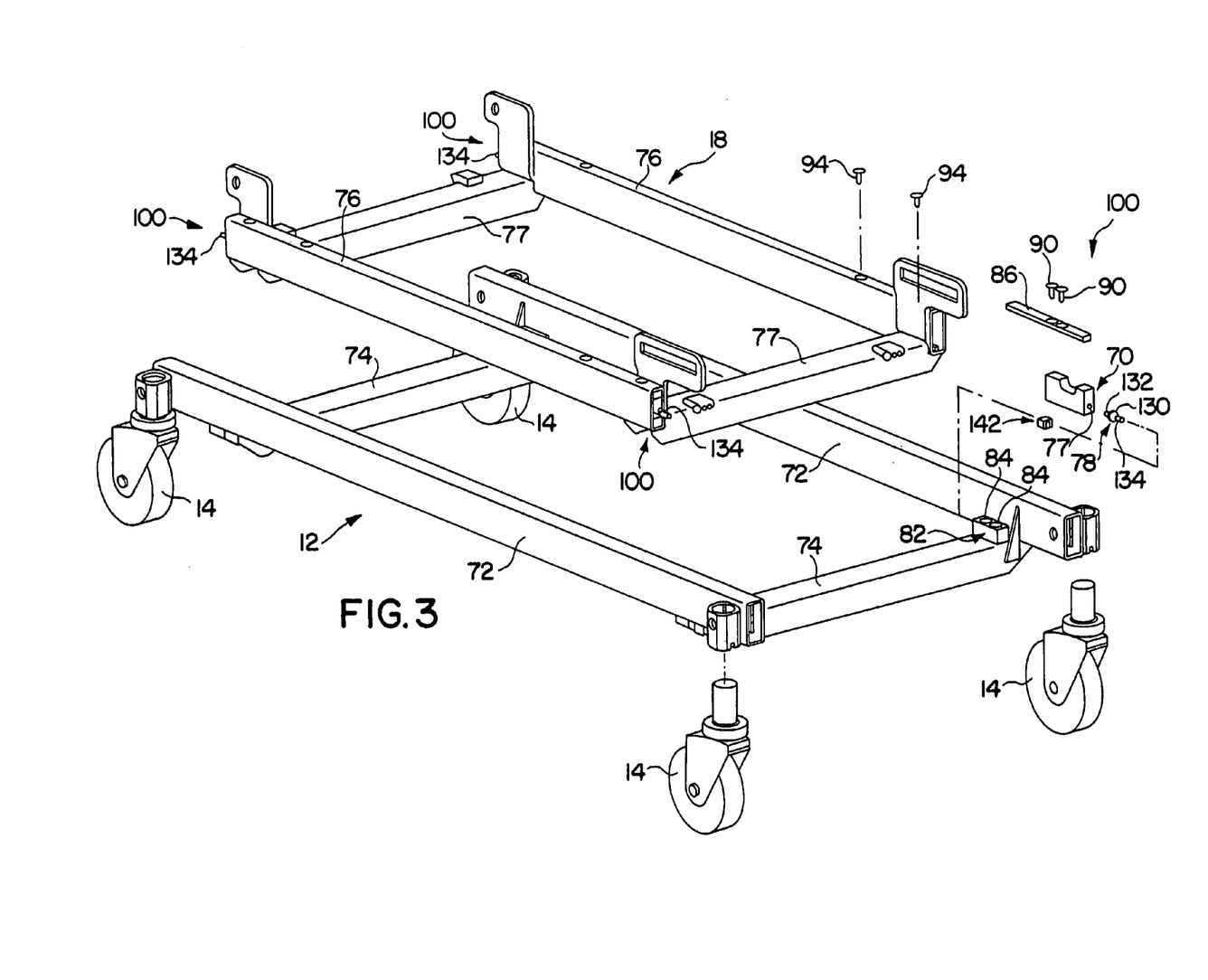
FIG. 3 is an exploded perspective view of the base frame and weigh frame of FIG. 2 showing, in the upper left-hand portion of the Fig., a load cell apparatus including an elongated mounting bar arranged for coupling to the weigh frame, a cell block beneath the mounting bar, a stud adjacent the cell block, a mounting member coupled to the base frame, and a liner between the mounting member and the stud.

Block 70 is coupled to a mounting bar 86 by suitable fasteners such as bolts 90 shown, for example, in FIGS. 2 and 3. Mounting bar 86 and block 70 are received in the interior region of frame member 76 and suitable fasteners, such as bolts 94, fasten mounting bar 86 to a top wall 92 of frame member 76 as shown best in FIG. 5. Spacers 96 are provided between mounting bar 86 and wall 92 to provided adequate clearance for the portion of fasteners 90 located above mounting bar 86. Alternatively, mounting bar 86 is formed with integral, upwardly extending bosses that perform the same function as spacers 96.

A stud 78 includes a hex nut portion 130, a threaded portion 132 on one side of portion 130, and a cylindrical portion 134 on the other side of portion 130. Portion 132 of stud 76 is threaded into an aperture 77, shown in FIG. 3, formed in block 70 until hex nut portion 130 abuts block 70 and cylindrical portion 134 extends longitudinally away from both block 70 and frame member 76. Load cell apparatus 100 further includes a mounting block, mounting tube, or other suitable mounting structure 82 (hereinafter referred to as "mount 82") that is coupled to a top surface of frame member 74 of base frame 12 by suitable fasteners such as bolts 84 as shown in FIGS. 2–5. Mount 82 is formed to include a bore 140, shown best in FIG. 4, and load cell apparatus 100 includes a liner 142 that is received in bore 150.

Figure 4:
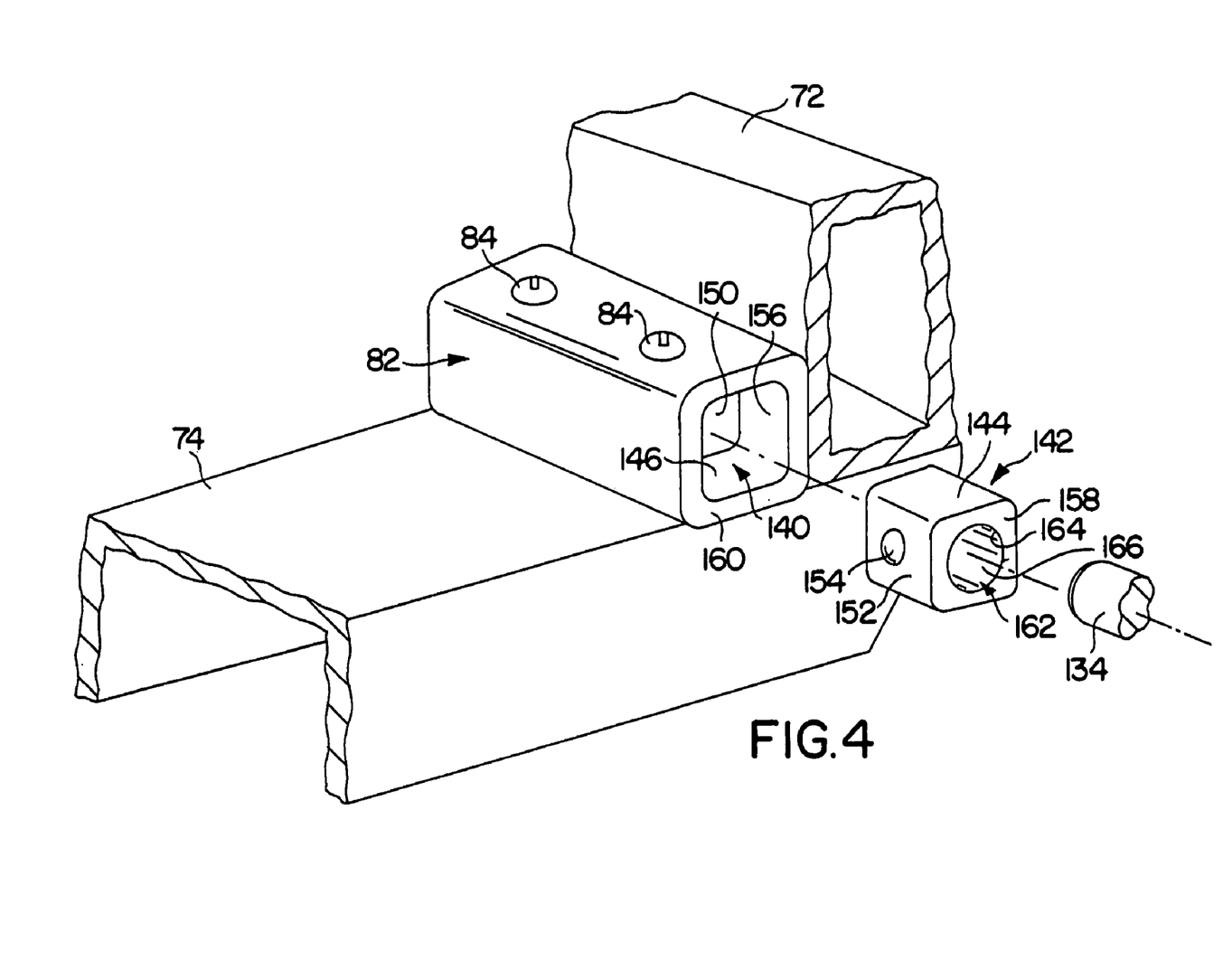
FIG. 4 is an exploded perspective view of a portion of the base frame of FIG. 3 showing the mounting member coupled to a lower frame member of the base frame, the mounting member including a square-shaped bore in an end thereof, the liner arranged for insertion into the bore, the liner including a cylindrical cavity, and a portion of the stud arranged for insertion into the cylindrical cavity of the liner.
Figure 6:
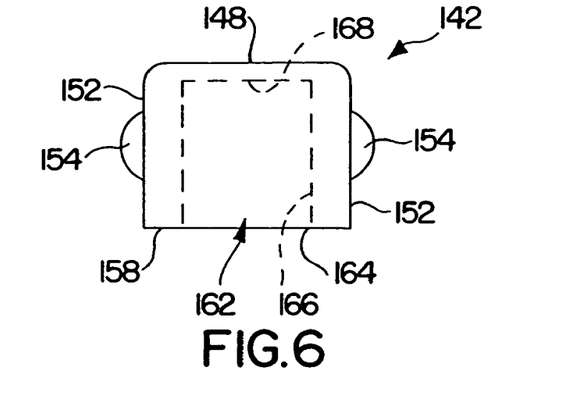
FIG. 6 is a top view of the liner of FIG. 5.
Figure 7:
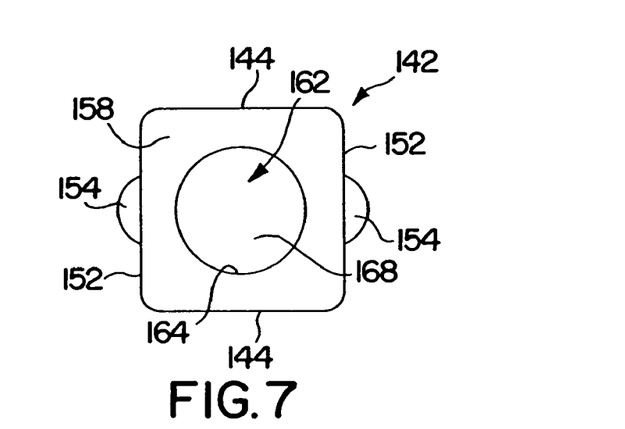
FIG. 7 is a front elevation view of the liner of FIG. 6.
Figure 8:
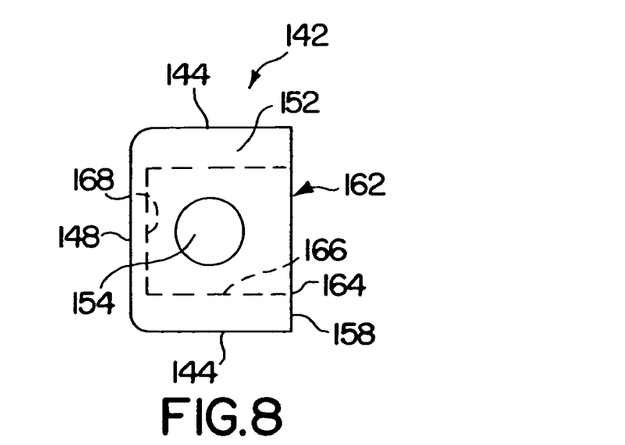
FIG. 8 is a side elevation view of the liner of FIG. 7.

Illustrative mount 82 and bore 140 each have a generally square-shaped cross section as shown in FIG. 4. In addition, liner 142 is generally cube-shaped and is sized to press fit into bore 140 such that top and bottom outer surfaces 144 of liner 142 engage respective top and bottom inner surfaces 146 of mount 82 and such that a rear surface 148 of liner 142 engages a seat surface 150 of mount 82. Liner 142 includes side surfaces 152 that are each formed to include a protrusion 154 that enhances the press fit of liner 142 with mount 82. Protrusions 154 engage respective side inner surfaces 156 of mount 82. Illustrative protrusions 154 are generally hemispherical in shape as shown best in FIGS. 6–8. Liner 142 is sized so that a front surface 158 thereof is substantially flush with a front surface 160 of mount 82.

Figure 5:
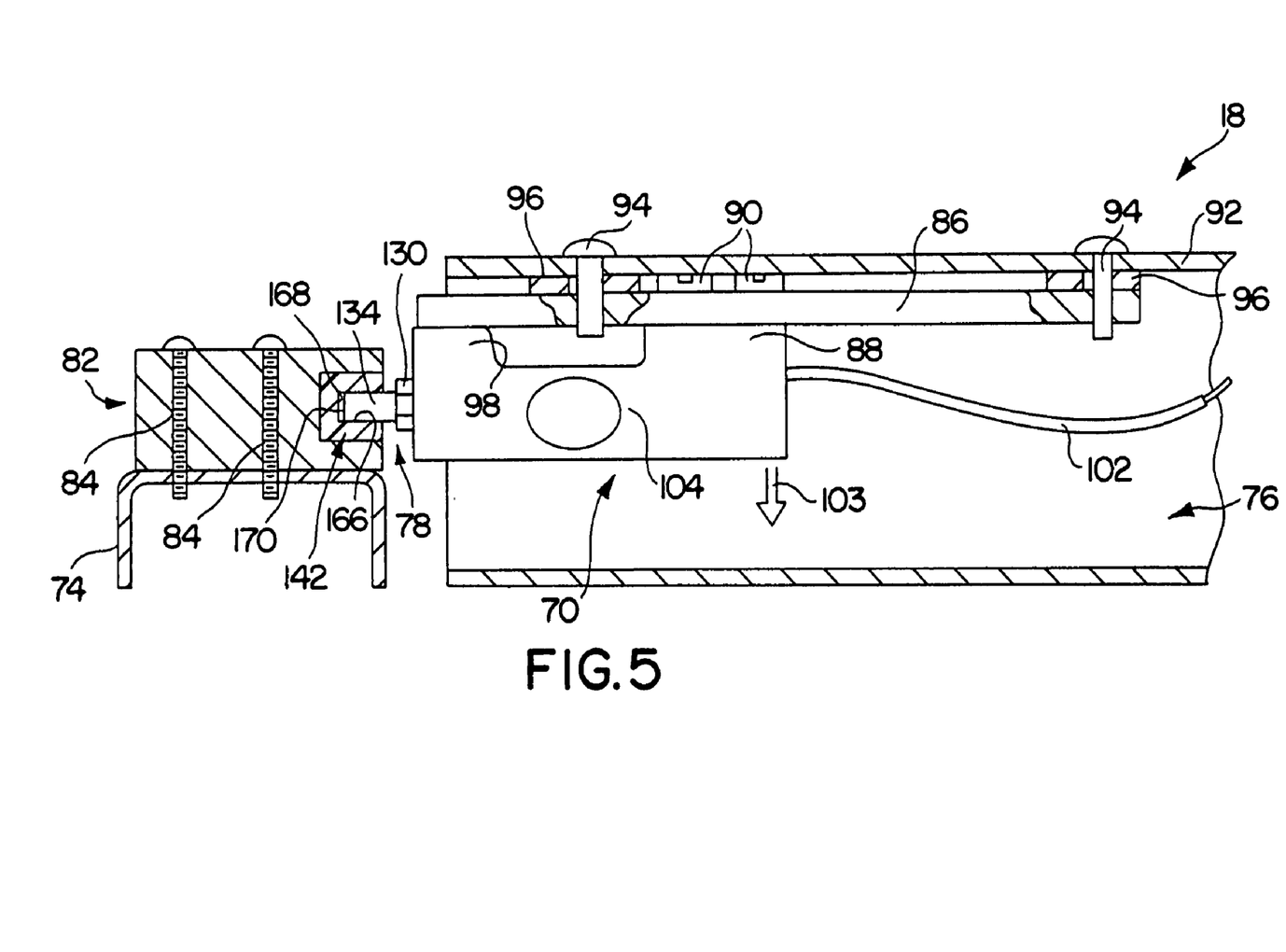
FIG. 5 is a partial sectional view of the base frame and weigh frame showing the load cell coupled to the elongated mounting bar which is coupled to a frame member of the weigh frame and showing the stud extending from the cell block to engage the liner which is mounted in the bore of the mounting member.

Liner 142 is formed to include a cylindrical cavity 162 as shown, for example, in FIG. 4. An opening 164 of cavity 162 is located at front face 158 of liner 142 and cavity 162 is bounded by a cylindrical surface 166 that extends from opening 164 toward rear surface 148 of liner 142. However, cavity 162 terminates at an end surface 168 that is substantially parallel with and located between rear and front surfaces 148, 158. As shown in FIG. 5, cylindrical portion 134 of stud 78 is received in cavity 162 and engages cylindrical surface 166 of liner 142. The diameter of cylindrical surface 166 is slightly larger than the diameter of cylindrical portion 134 of stud 78 so that a small amount of clearance is provided between cylindrical portion 134 of stud 78 and cylindrical surface 166. In addition, bore 162 of liner 142 is configured such that a gap, shown in FIG. 5, exists between end surface 168 of liner 142 and an end surface 170 of cylindrical portion 134 of stud 78. The axial clearance between surfaces 168, 170 and the diametral clearance between cylindrical portion 134 of stud 78 and cylindrical surface 166 of liner 142 permits stud 78, cell block 70, mounting bar 86, weigh frame 18, and the rest of bed 10 supported by weigh frame 18 to float relative to liner 142, mount 82, and base frame 12.

In preferred embodiments, cell block 70, stud 78, and mount 82 are made of a metal material, whereas liner 142 is made of a material that is more lubrous than the material from which mount 82 and/or stud 78 is made. In a preferred embodiment, mount 82 is made of FC-0208-50 steel and is zinc plated, cell block 70 is made of aluminum, and stud 78 is either 4140 C.D.S. steel or 4142 C.D.S. steel. Examples of materials that are suitable for liner 142 when stud 78 and mount 82 are made of steel include TEFLONO material; urethane material; and neoprene material. In a preferred embodiment, liner 142 is made of ninety-five (95) durometer Shore A urethane. However, it is understood that the material from which cell block 70, stud 78, mount 82, and liner 142 is not limited to those materials listed above. Therefore, those skilled in the art will appreciate that liner 142 may be made of other suitable material within the scope of the present invention so long as such material is more lubrous than the material from which mount 82 and/or stud 78 is made.

Prior art load cell apparatus typically have metal-to-metal contact between their respective studs and their respective mounts. Because the lubricity of liner 142 is greater than the lubricity of mount 82, the force required to move stud 78 relative to liner 142 is lower than if stud 78 were permitted to contact mount 82 directly. As shown in FIG. 5, cell block 70 of load cell apparatus 100 includes a first portion 88 that abuts mounting bar 86, a second portion 98 that is spaced from mounting bar 86 by a slight amount, and a reduced-thickness portion 104 interconnecting portions 88, 98. Increasing the weight supported by weigh frame 18 causes portion 88 to move downwardly in the direction of double arrow 103, shown in FIG. 5, thereby causing portion 104 to flex. The strain gages (not shown) are coupled to portion 104 and therefore, flexing of portion 104 flexes the strain gages to change an output signal which provides an indication of the weight supported by weigh frame 18. As mentioned above, the output signal is communicated to conventional signal conditioning circuitry by output leads which are contained in cable 102.

When a predetermined "maximum" amount of weight is supported by weigh frame 18, mounting bar 86 will contact portion 98 of cell block 70 thereby preventing portion 88 from moving in direction 103 any further even if additional weight beyond the "maximum" amount is added to the weigh frame 18. This feature is well-known in the art and prevents overflexing of portion 104 and prevents damage to the strain gages.

During flexing of portion 104 of cell block 70, cylindrical portion 134 of stud 78 moves along cylindrical surface 166 by a small amount relative to liner 142 and relative to mount 82. Thus, sliding bearing contact exists between stud 78 and liner 142. Frictional forces between stud 78 and liner 142 have a tendency to inhibit stud 78 from moving relative to liner 142 and relative to mount 82. In the event that stud 78 ceases to move by some minute amount relative to liner 142 due to friction, then portion 104 of cell block 70 is prevented from flexing by a corresponding minute amount which introduces a source of error that results in an inaccurate output signal. Therefore, reducing the friction acting on stud 78 to inhibit its movement reduces the error generated as a result of the friction. Therefore, as a result of the lubricity of liner 142, the friction acting on stud 78 is lower than if stud 78 were permitted to contact mount 82 directly which reduces output signal error and allows for more accurate weight readings to be made.

Figure 9:
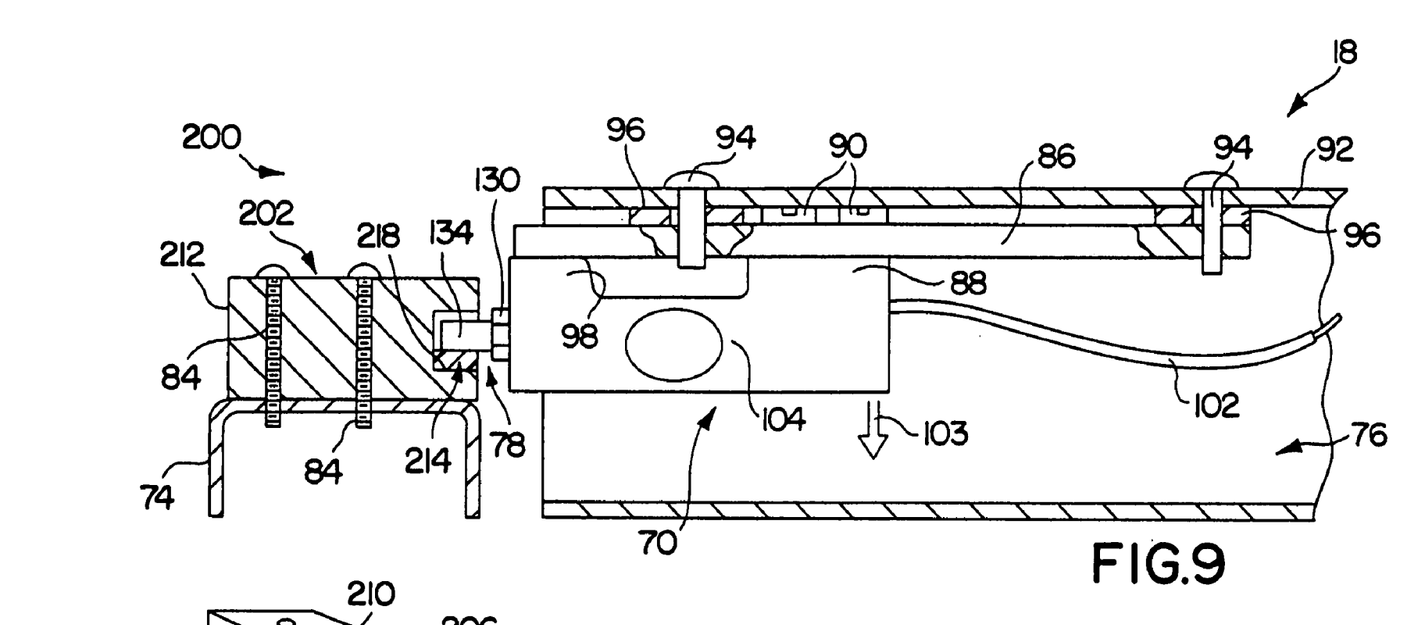
FIG. 9 is a partial sectional view of the base frame, the weigh frame, and a first alternative embodiment load cell apparatus in accordance with the present invention showing a stud having a cylindrical portion extending from a cell block, a mount having a bore formed therein, a quantity of material in a bottom portion of the bore, and the cylindrical portion of the stud engaging the material.
Figure 10:
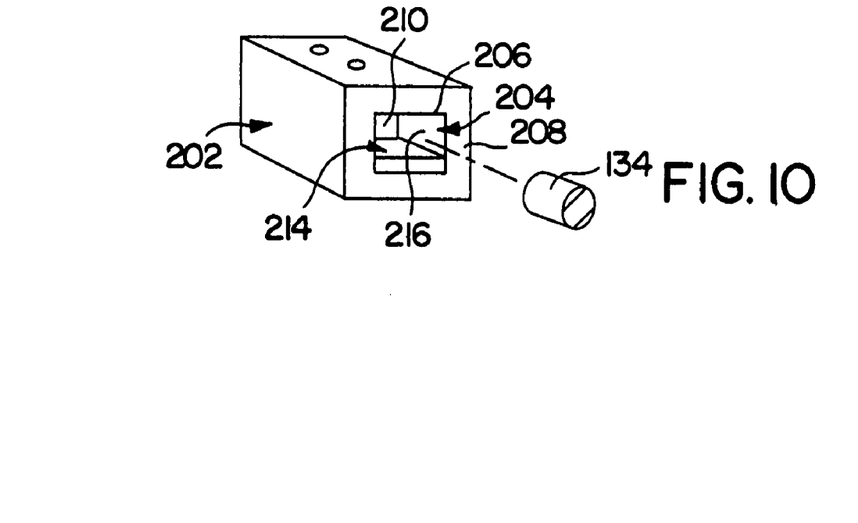
FIG. 10 is a perspective view of the mount and a portion of the stud of FIG. 9 showing that the bore is a generally square-shaped cavity and showing that the quantity of material is a flat pad.

A first alternative embodiment load cell apparatus 200 is shown in FIGS. 9 and 10. Many of the components of load cell apparatus 200 are substantially the same as components of load cell apparatus 100 and therefore, like reference numerals are used to denote like components. Load cell apparatus 200 includes a mount 202 having a bore 204 formed therein. Bore 204 has a substantially square-shaped cross section and extends from an opening 206 formed at a front surface 208 of mount 202 to an end surface 210 that is positioned to lie between front surface 208 and a rear surface 212 of mount 202.

Load cell apparatus 200 includes a liner 214 as shown in FIGS. 9 and 10. Liner 214 comprises a quantity of material configured as a flat pad that is received in the bore 202. Liner 214 may be made of any of the materials described above in connection with liner 142 so long as liner 214 is more lubrous than the material from which mount 202 and/or stud 78 is made. Liner 214 is either press fit between inner side walls 216 of mount 202 or is adhered to a bottom inner surface 218 of mount 202 or both. In addition, cylindrical portion 134 of stud 78 rests upon liner 214.

Figure 11:
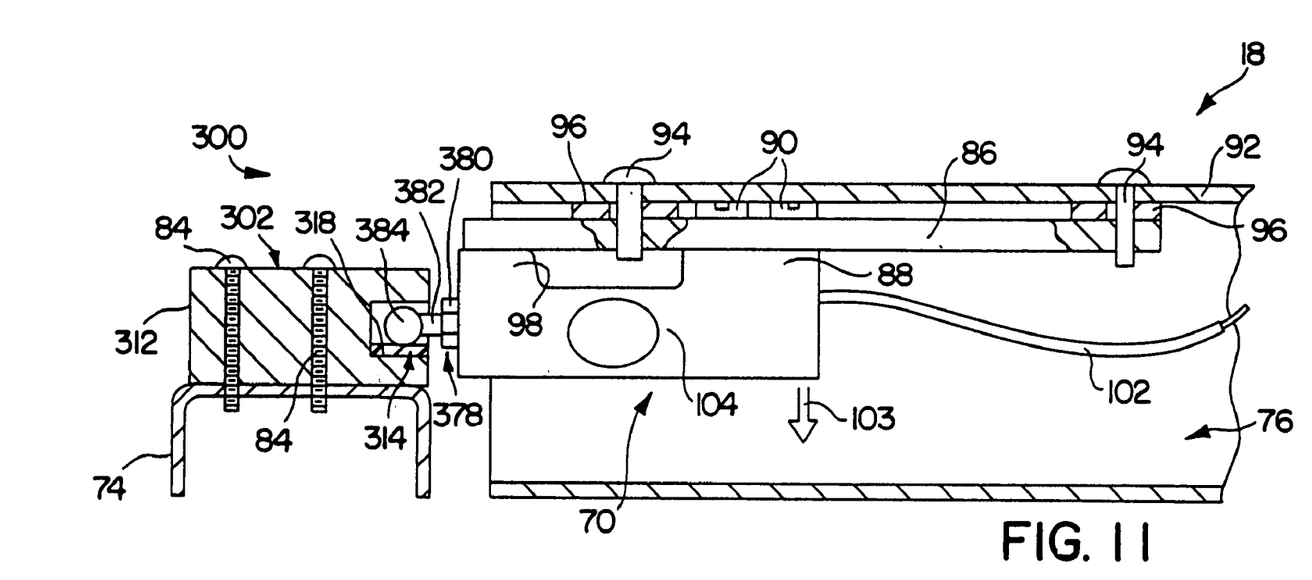
FIG. 11 is a partial sectional view of the base frame, the weigh frame, and a second alternative embodiment load cell apparatus in accordance with the present invention showing a stud having a spherical portion extending from a cell block, a mount having a bore formed therein, a quantity of material in a bottom portion of the bore, and the spherical portion of the stud engaging the material.
Figure 12:
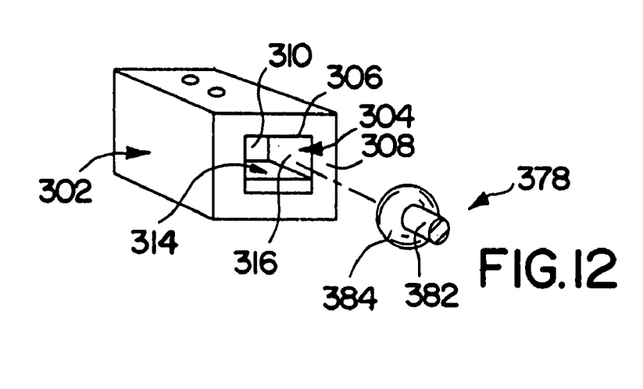
FIG. 12 is a perspective view of the mount and a portion of the stud of FIG. 11 showing that the bore is a generally square-shaped cavity and showing that the quantity of material is a flat pad.

A second alternative embodiment load cell apparatus 300 is shown in FIGS. 11 and 12. Many of the components of load cell apparatus 300 are substantially the same as components of load cell apparatus 100 and therefore, like reference numerals are used to denote like components. Load cell apparatus 300 includes a mount 302 having a bore 304 formed therein. Bore 304 has a substantially square-shaped cross section and extends from an opening 306 formed at a front surface 308 of mount 302 to an end surface 310 that is positioned to lie between front surface 308 and a rear surface 312 of mount 302. Load cell apparatus 300 also includes a stud 378 having a hex nut portion 380, a connector portion 382 extending from portion 380, and a spherical portion 384 appended to portion 382 as shown in FIG. 11. In addition, stud 378 includes a threaded portion (not shown) that is substantially similar to threaded portion 132 of stud 78 of load cell apparatus 100.

Load cell apparatus 300 further includes a liner 314 as shown in FIGS. 11 and 12. Liner 314 comprises a quantity of material configured as a flat pad that is received in bore 302. Liner 314 may be made of any of the materials described above in connection with liner 142 so long as liner 314 is more lubrous than the material from which mount 302 and/or stud 378 is made. Liner 314 is either press fit between inner side walls 316 of mount 302 or is adhered to a bottom inner surface 318 of mount 302 or both. In addition, spherical portion 384 of stud 378 rests upon liner 314.

Figures 13, 14:
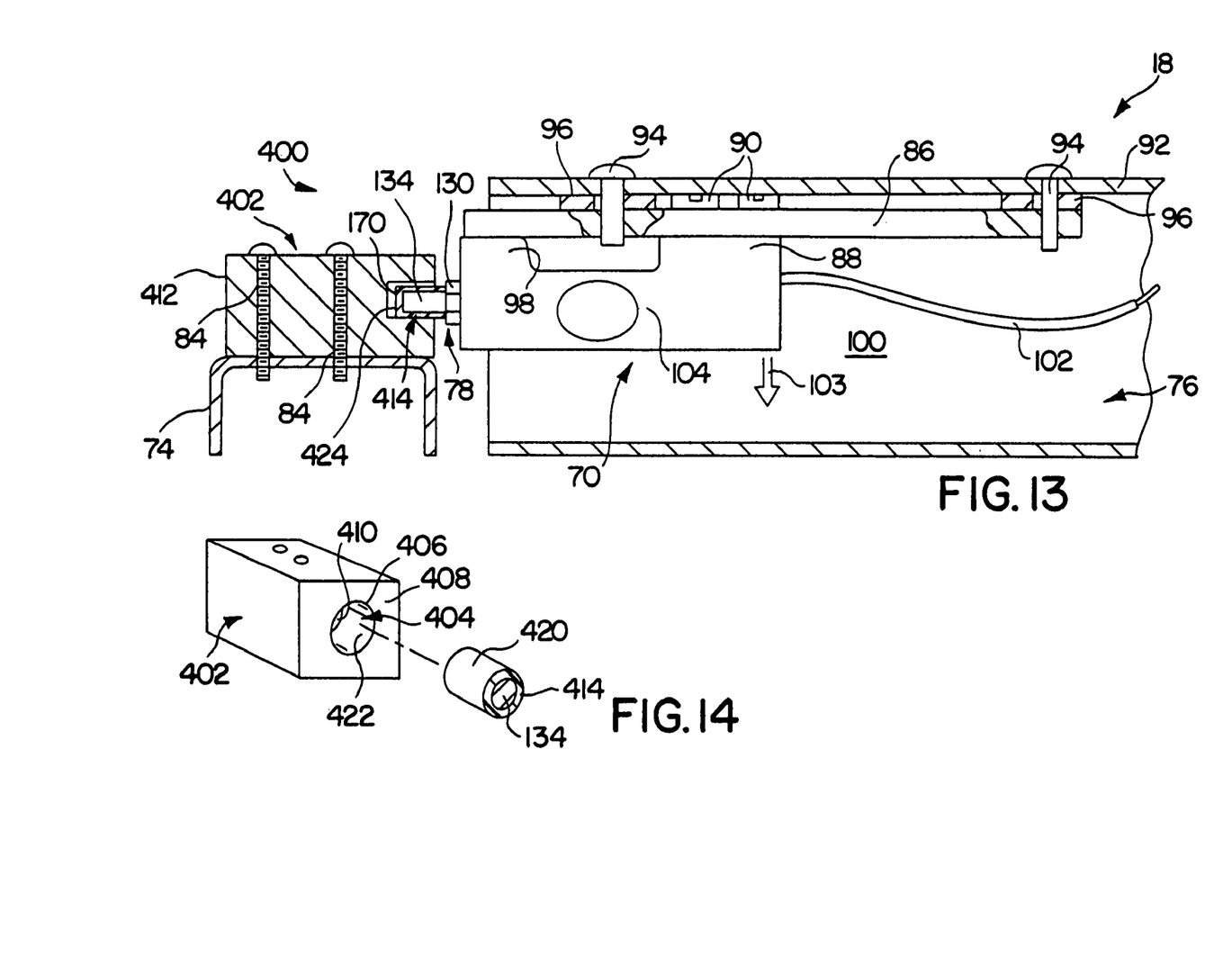
FIG. 13 is a partial sectional view of the base frame, the weigh frame, and a third alternative embodiment load cell apparatus in accordance with the present invention showing a stud having a cylindrical portion extending from a cell block, a mount having a bore formed therein, a quantity of material coating the cylindrical portion of the stud, and the coated cylindrical portion of the stud being received in the bore of the mount.
FIG. 14 is a perspective view of the mount and a portion of the stud of FIG. 13 showing that the bore is a cylindrical cavity.

A fourth alternative embodiment load cell apparatus 400 is shown in FIGS. 13 and 14. Many of the components of load cell apparatus 400 are substantially the same as components of load cell apparatus 100 and therefore, like reference numerals are used to denote like components. Load cell apparatus 400 includes a mount 402 having a bore 404 formed therein. Bore 404 is bounded by a cylindrical bore surface 422 that extends from an opening 406 formed at a front surface 408 of mount 402 to an end surface 410 that is positioned to lie between front surface 408 and a rear surface 412 of mount 402.

Load cell apparatus 400 includes a liner 414 as shown in FIGS. 9 and 10. Liner 414 comprises a quantity of material that coats cylindrical portion 134 of stud 78. Liner 414 may be made of any of the materials described above in connection with liner 142 so long as liner 414 is more lubrous than the material from which mount 402 and/or stud 78 is made. Liner 414 is either press fit onto cylindrical portion 134 of stud 78 or is adhered thereto or both. Optionally, liner 414 may be fashioned as a cap, as shown in FIG. 13, or a cylindrical sleeve (not shown) that has an open end adjacent end surface 170 of cylindrical portion 134 of stud 78. In either case, the cylindrical outer surface 420 of liner 414 engages cylindrical bore surface 422 of mount 402. The diameter of bore surface 222 is slightly larger than the diameter of outer surface 420 of liner 414 to provide a small amount of diametral clearance therebetween. In addition, bore 404 of mount 402 is sized such that axial clearance exits between an end surface 424 of liner and end surface 410.

Figures 15, 16:
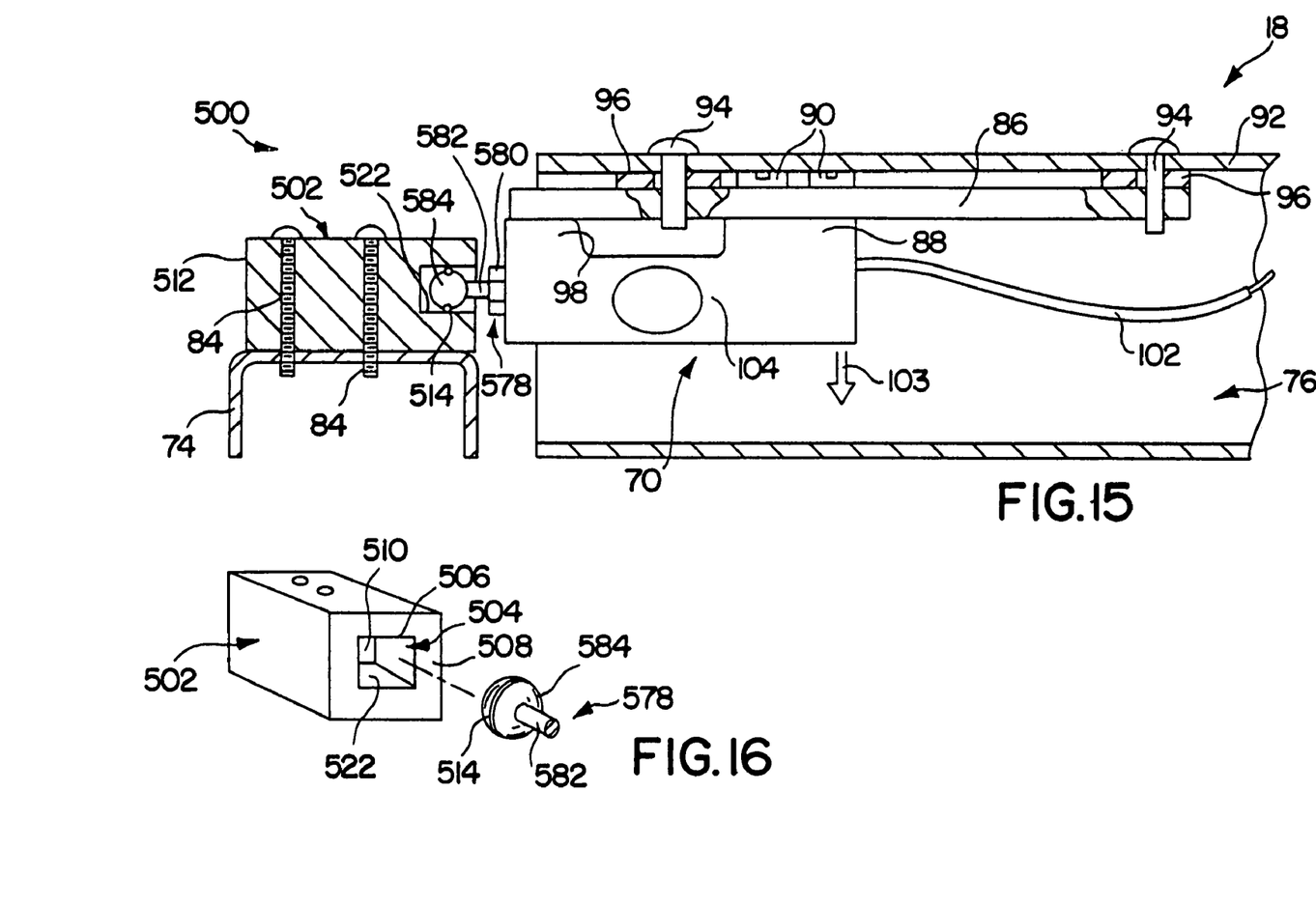
FIG. 15 is a partial sectional view of the base frame, the weigh frame, and a fourth alternative embodiment load cell apparatus in accordance with the present invention showing a stud having a spherical portion extending from a cell block, a mount having a bore formed therein, and an O-ring coupled to the spherical portion of the stud.
FIG. 16 is a perspective view of the mount and portion of the stud of FIG. 15 showing that the bore is a generally square-shaped cavity.

A fifth alternative embodiment load cell apparatus 500 is shown in FIGS. 15 and 16. Many of the components of load cell apparatus 500 are substantially the same as components of load cell apparatus 100 and therefore, like reference numerals are used to denote like components. Load cell apparatus 500 includes a mount 502 having a bore 504 formed therein. Bore 504 has a substantially square-shaped cross section and extends from an opening 506 formed at a front surface 508 of mount 502 to an end surface 510 that is positioned to lie between front surface 508 and a rear surface 512 of mount 502. Load cell apparatus 500 also includes a stud 578 having a hex nut portion 580, a connector portion 582 extending from portion 580, and a spherical portion 584 appended to portion 582 as shown in FIG. 15. In addition, stud 578 also includes a threaded portion (not shown) that is substantially similar to threaded portion 132 of stud 78 of load cell apparatus 100.

Load cell apparatus 500 includes a liner 514 as shown in FIGS. 15 and 16. Liner 514 comprises a quantity of material fashioned as an O-ring that is coupled to spherical portion 584. Alternatively, spherical portion 584 is coated with a quantity of material to provide the liner. Liner 514 may be made of any of the materials described above in connection with liner 142 so long as liner 514 is more lubrous than the material from which mount 502 and/or stud 578 is made. Liner 514 is received in a groove formed around spherical portion 584. Optionally adhesive may be used between O-ring 514 and portion 584. O-ring 514 engages a bottom inner surface 522 of mount 502.

Those skilled in the art will appreciate that the bores formed in the mounts of the respective above-described embodiments may have shapes other than those illustrated without exceeding the scope of the present invention. For example, bores that are shown as having square-shaped cross sections may instead have cylindrical cross sections and vice versa. In addition, the bores formed in the mounts of each of the respective embodiments may be hexagonal, octagonal, etc. and the liners used with such mounts would be shaped accordingly. In addition, those skilled in the art will appreciate that, although the bores formed in the mounts of the respective above-described embodiments terminate within the respective mounts, it is within the scope of the invention as presently perceived for the bores to extend all the way through the mounts such that the respective mounts are generally tubular.

Those skilled in the art will appreciate that, although the load cell apparatus are described herein as being coupled to a base frame 12 and a weigh frame 18, it is within the scope of the present invention for the load cell apparatus to couple to any type of structure or support. Therefore, the term "structure" as used in the claims is intended to be non-limiting and to mean any and all types of frames, bases, structures, supports, pedestals, decks, etc. In addition, although the each of the load cell apparatus described herein include cell block 70, those skilled in the art will appreciate that other types of cell blocks, load beams, and load members may be used in lieu of cell block 70. Therefore, the term "cell block" as used in the claims is intended to mean load members of all types and of all shapes.

Although the invention has been described in detail with reference to certain illustrated embodiments, variations and modifications exist within the scope and spirit of the invention as described and as defined in the following claims.

What is claimed is:

1. A load cell apparatus comprising
    a cell block adapted to couple to a first structure,
    a mount adapted to couple to a second structure, the mount being made of a first material, the mount being formed to include a bore,
    a stud extending from the cell block, and
    a liner positioned to lie in the bore, the stud engaging the liner, and the liner being made of a second material that is more lubrous than the first material, a space being defined between the stud and the mount to permit relative movement between the stud and the mount.

2. The load cell apparatus of claim 1, wherein the mount includes an upwardly facing inner surface and the liner engages the upwardly facing inner surface.

3. The load cell apparatus of claim 1, wherein at least a portion of the liner is positioned to lie beneath the stud.

4. The load cell apparatus of claim 1, wherein the liner surrounds the stud.

5. The load cell apparatus of claim 1, wherein the liner is affixed to the mount.

6. The load cell apparatus of claim 5, wherein the liner is a flat pad.

7. The load cell apparatus of claim 1, wherein the liner is affixed to the stud.

8. The load cell apparatus of claim 7, wherein the liner is an O-ring.

9. The load cell apparatus of claim 7, wherein the liner is a sleeve.

10. The load cell apparatus of claim 7, wherein the liner coats the stud.

11. The load cell apparatus of claim 1, wherein the bore defines an axis, the stud moves axially during deflection of the cell block, and the stud maintains contact with the liner during axial movement.

12. A patient support comprising
a frame including a base frame, an intermediate frame supported by the base frame, and a weigh frame adapted to support the weight of a patient, and
a load cell apparatus positioned between the intermediate frame and the weigh frame to support the weigh frame on the intermediate frame, the load cell apparatus including a cell block supporting the weigh frame, a stud coupled to and extending from the cell block, a mount supported by the intermediate frame and including a bore, and a resilient liner positioned in the bore of the mount between the stud and the mount to transfer all force between the stud and the mount, the stud including a circular portion positioned adjacent to the resilient liner to permit the stud to move relative to the mount.

13. The patient support of claim 12, wherein the resilient liner is made of neoprene.

14. The patient support of claim 12, wherein the stud has a longitudinal axis and the circular portion includes a cross-section perpendicular to the longitudinal axis with a perimeter having a uniform radius of curvature.

15. The patient support of claim 14, wherein the circular portion is spherical.

16. The patient support of claim 12, wherein the resilient liner is positioned below the stud.

17. The patient support of claim 12, wherein the cell block includes an aperture and a portion of the stud is positioned in the aperture.

18. The patient support of claim 12, wherein a space is defined between the stud and the mount to provide clearance for the stud to move relative to the mount.

19. The patient support of claim 18, wherein the space is positioned between the resilient liner and the stud.

20. The patient support of claim 18, wherein the stud and the mount cooperate to define the space.

21. The patient support of claim 18, wherein the space is positioned between the resilient liner and the mount.

22. A load cell apparatus comprising
a load cell adapted to couple to a first structure, the load cell including a load cell block and a circular portion, the circular portion having a central axis,
a mount adapted to couple to a second structure, and
a resilient member positioned between the load cell and the mount to transmit all force between the load cell and the mount, the central axis being perpendicular to the transmitted force.

23. A load cell apparatus comprising
a load cell adapted to couple to a first structure,
a mount adapted to couple to a second structure, and
a resilient member positioned between the load cell and the mount to transmit all force between the load cell and the mount, the resilient member being positioned below the load cell and above the mount so that downward force is transmitted from the load cell to the mount.

24. The load cell apparatus of claim 22, wherein the sole support between the load cell and the mount is provided by the resilient member.

25. The load cell apparatus of claim 22, wherein load cell includes a cell block and a stud coupled to and extending from the cell block, the stud has a circular portion, the resilient member is positioned between the circular portion of the stud and the mount.

26. A load cell apparatus comprising
a load cell adapted to couple to a first structure,
a mount adapted to couple to a second structure, and
a liner positioned between the mount and the load cell, a space being provided between the load cell and mount to permit horizontal movement of the load cell relative to the mount.

27. The load cell apparatus of claim 26, wherein the space is positioned between the liner and the load cell.

28. A load cell apparatus comprising
a load cell adapted to couple to a first structure,
a mount adapted to couple to a second structure, and
a liner positioned between the mount and the load cell, a space being provided between the load cell and mount to permit movement of the load cell relative to the mount, the space being positioned between the liner and the mount.

29. The load cell apparatus of claim 26, wherein the load cell includes a longitudinal axis and the space permits movement between the load cell and the mount along the longitudinal axis.

30. The load cell apparatus of claim 26, wherein liner is made of a resilient material.

31. The load cell apparatus of claim 26, wherein the load cell moves relative to the liner during relative movement between the load cell and the mount.

32. A load cell apparatus comprising
a load cell adapted to couple to a first structure,
a mount adapted to couple to a second structure, and
a liner positioned between the mount and the load cell, a space being provided between the load cell and mount to permit movement of the load cell relative to the mount, the liner moving relative to the mount during relative movement between the load cell and the mount.

33. The load cell apparatus of claim 26, wherein the mount defines a bore and the space is positioned in the bore.

34. A load cell apparatus comprising
a cell block adapted to couple to a first structure,
a mount adapted to couple to a second structure,
a stud extending horizontally from the cell block and having a circular portion, and
a resilient member positioned between the circular portion and the mount to transmit force between the circular portion and the mount.

35. The load cell apparatus of claim 34, wherein the stud includes a longitudinal axis and the circular portion has a cross-section perpendicular to the longitudinal axis with a perimeter having a uniform radius of curvature.

36. A load cell apparatus comprising
a cell block adapted to couple to a first structure,
a mount adapted to couple to a second structure,
a stud extending from the cell block and having a circular portion, the circular portion being spherical, and a resilient member positioned between the circular portion and the mount to transmit force between the circular portion and the mount.

37. The load cell apparatus of claim 36, wherein the stud includes another circular portion that is cylindrical and coupled to the first mentioned circular portion.

38. The load cell apparatus of claim 34, wherein the circular portion is in contact with the resilient member.

39. The load cell apparatus of claim 34, wherein the resilient member supports the stud.

40. A patient support comprising
a frame including a base frame, an intermediate frame supported by the base frame, and a weigh frame adapted to support the weight of a patient,
a mattress supported on the weigh frame, and
a load cell apparatus positioned between the intermediate frame and the weigh frame to support the weigh frame on the intermediate frame, the load cell apparatus including a load cell coupled to the weigh frame, a mount coupled to the intermediate frame, and a liner positioned between the load cell and mount to transfer force from the load cell to the mount.

41. The patient support of claim 40, wherein the liner is made of a resilient material.

42. The patient support of claim 40, wherein force is transferred from the load cell solely through the liner.

43. The patient support of claim 40, wherein the load cell includes a cell block and a stud coupled to the load cell, the liner is positioned between the stud and the mount.

44. A load cell apparatus comprising
a load cell adapted to couple to a first structure adapted to support a load to be measured, the load cell including a cell block and a stud coupled to the load cell, the stud including a circular portion,
a mount adapted to couple to a second structure, and
a liner positioned between the load cell and mount to transfer force from the load cell to the mount, the liner being positioned between the stud and the mount, and the liner being positioned under the circular portion.

45. A load cell apparatus comprising
a cell block adapted to couple to a first structure, the cell block having a longitudinal axis and first and second longitudinally spaced-apart ends,
a mount adapted to couple to a second structure,
a stud coupled to the first end of the cell block to extend along the longitudinal axis, and
a liner positioned between the stud and the mount, the liner being configured to permit sliding of the stud relative to the mount.

46. The load cell apparatus of claim 45, wherein the liner is made of a resilient material.

47. The load cell apparatus of claim 45, wherein the stud includes a circular portion.

48. The load cell apparatus of claim 47, wherein the circular portion is spherical.

49. The load cell apparatus of claim 47, wherein the circular portion is cylindrical.

50. The load cell apparatus of claim 47, wherein the circular portion is adjacent to the liner.

51. The load cell apparatus of claim 45, wherein the stud includes a longitudinal axis and the sliding occurs along the longitudinal axis.

52. The load cell apparatus of claim 23, wherein the load cell includes a cell block and a stud and the resilient member is positioned below the stud.

53. The load cell apparatus of claim 52, wherein the resilient member encases the stud.

54. The load cell apparatus of claim 53, wherein
the stud is configured to slide relative to the resilient member.

55. The load cell apparatus of claim 52, wherein the stud includes a circular portion in contact with the resilient member.

56. The load cell apparatus of claim 52, wherein the stud has a width less than a width of the cell block.

57. The load cell apparatus of claim 52, wherein the stud contacts the resilient member.

58. The load cell apparatus of claim 57, wherein the stud includes a circular portion that slides on the resilient member.

59. The load cell apparatus of claim 32, wherein the load cell includes a cell block and a stud.

60. The load cell apparatus of claim 32, wherein the stud includes a circular portion in contact with the resilient member.

61. The load cell apparatus of claim 36, wherein the circular portion contacts the resilient member.

62. The load cell apparatus of claim 36, wherein the resilient member is positioned below the circular portion.

63. The load cell apparatus of claim 44, wherein the circular portion contacts the liner.

64. The load cell apparatus of claim 44, wherein the stud has a width that is less than a width of the cell block.

65. The load cell apparatus of claim 44, wherein the stud has a longitudinal axis that is horizontal.

* * * * *